(12) United States Patent
Cho et al.

(10) Patent No.: US 7,742,232 B2
(45) Date of Patent: Jun. 22, 2010

(54) THREE-DIMENSIONAL IMAGING SYSTEM (75) Inventors: Gyoung Il Cho, Seoul (KR); Hye Young Kim, Jeonnam (KR); Jin Young Sohn, Seoul (KR); Cheong Soo Seo, Seongnam (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 204 days.

(21) Appl. No.: 11/382,707

(22) Filed: May 11, 2006

(65) Prior Publication Data

US 2006/0209439 A1 Sep. 21, 2006

Related U.S. Application Data

(63) Continuation-in-part of application No. 10/822,414, filed on Apr. 12, 2004, now Pat. No. 7,068,416, and a continuation-in-part of application No. 10/855,715, filed on May 27, 2004, now Pat. No. 7,031,046, and a continuation-in-part of application No. 10/872,241, filed on Jun. 18, 2004, now Pat. No. 7,382,516, and a continuation-in-part of application No. 10/893,039, filed on Jul. 16, 2004, now Pat. No. 7,239,438, and a continuation-in-part of application No. 10/896,146, filed on Jul. 21, 2004, now Pat. No. 7,215,882, and a continuation-in-part of application No. 10/979,612, filed on Nov. 2, 2004, now Pat. No. 7,173,653, and a continuation-in-part of application No. 10/983,353, filed on Nov. 8, 2004, now Pat. No. 7,267,447, and a continuation-in-part of application No. 11/072,597, filed on Mar. 4, 2005, now Pat. No. 7,330,297, and a continuation-in-part of application No. 11/076,616, filed on Mar. 10, 2005, now Pat. No. 7,274,517, and a continuation-in-part of application No. 11/191,886, filed on Jul. 28, 2005, now Pat. No. 7,095,548, and a continuation-in-part of application No. 11/208,115, filed on Aug. 19, 2005, now abandoned, and a continuation-in-part of application No. 11/218,814, filed on Sep. 2, 2005, and a continuation-in-part of application No. 11/286,971, filed on Nov. 23, 2005, and a continuation-in-part of application No. 11/294,944, filed on Dec. 6, 2005, now Pat. No. 7,212,330, and a continuation-in-part of application No. 11/300,205, filed on Dec. 13, 2005, now Pat. No. 7,580,178, and a continuation-in-part of application No. 11/314,408, filed on Dec. 20, 2005, and a continuation-in-part of application No. 11/319,987, filed on Dec. 28, 2005, now Pat. No. 7,410,266, and a continuation-in-part of application No. 11/341,214, filed on Jan. 28, 2006, now Pat. No. 7,619,614, and a continuation-in-part of application No. 11/369,797, filed on Mar. 6, 2006, now Pat. No. 7,474,454.

(51) Int. Cl.
*G02B 27/10* (2006.01)

(52) U.S. Cl. ...................................... 359/619; 359/626

(58) Field of Classification Search ................. 359/619
See application file for complete search history.

(56) References Cited

U.S. PATENT DOCUMENTS 2,002,376 A 5/1935 Mannheimer (Continued)

FOREIGN PATENT DOCUMENTS

JP 08-043881 2/1996

(Continued)

*Primary Examiner*—Jordan M. Schwartz
*Assistant Examiner*—James C Jones (57) ABSTRACT

A new three-dimensional imaging system has been needed to overcome the problems of the prior arts using conventional variable focal length lenses, which have slow response time, small focal length variation, and low focusing efficiency, and require a complex mechanism to control it. The three-dimensional imaging system of the present invention uses the variable focal length micromirror array lens. Since the micromirror array lens has many advantages such as very fast response time, large focal length variation, high optical focusing efficiency, large size aperture, low cost, simple mechanism, and so on, the three-dimensional imaging system can get a real-time three-dimensional image with large depth range and high depth resolution.

27 Claims, 7 Drawing Sheets

U.S. PATENT DOCUMENTS

| | | | |
|---|---|---|---|
| 4,407,567 A | 10/1983 | Michelet | |
| 4,834,512 A | 5/1989 | Austin | |
| 5,004,319 A | 4/1991 | Smither | |
| 5,212,555 A | 5/1993 | Stoltz | |
| 5,369,433 A | 11/1994 | Baldwin | |
| 5,402,407 A | 3/1995 | Eguchi | |
| 5,467,121 A | 11/1995 | Allcock | |
| 5,612,736 A | 3/1997 | Vogeley | |
| 5,696,619 A | 12/1997 | Knipe | |
| 5,881,034 A | 3/1999 | Mano | |
| 5,897,195 A | 4/1999 | Choate | |
| 5,986,811 A | 11/1999 | Wohlstadter | |
| 6,025,951 A | 2/2000 | Swart | |
| 6,028,689 A | 2/2000 | Michaliek | |
| 6,064,423 A | 5/2000 | Geng | |
| 6,084,843 A | 7/2000 | Abe | |
| 6,104,425 A | 8/2000 | Kanno | |
| 6,111,900 A | 8/2000 | Suzudo | |
| 6,123,985 A | 9/2000 | Robinson | |
| 6,282,213 B1 | 8/2001 | Gutin et al. | |
| 6,315,423 B1 | 11/2001 | Yu | |
| 6,329,737 B1 | 12/2001 | Jerman | |
| 6,498,673 B1 | 12/2002 | Frigo | |
| 6,507,366 B1 | 1/2003 | Lee | |
| 6,549,730 B1 | 4/2003 | Hamada | |
| 6,625,342 B2 | 9/2003 | Staple et al. | |
| 6,649,852 B2 | 11/2003 | Chason | |
| 6,650,461 B2 | 11/2003 | Atobe | |
| 6,658,208 B2 | 12/2003 | Watanabe | |
| 6,711,319 B2 | 3/2004 | Hoen | |
| 6,741,384 B1 | 5/2004 | Martin | |
| 6,784,771 B1 | 8/2004 | Fan | |
| 6,833,938 B2 | 12/2004 | Nishioka | |
| 6,885,819 B2 | 4/2005 | Shinohara | |
| 6,900,901 B2 | 5/2005 | Harada | |
| 6,900,922 B2 | 5/2005 | Aubuchon | |
| 6,906,848 B2 | 6/2005 | Aubuchon | |
| 6,906,849 B1 | 6/2005 | Mi | |
| 6,914,712 B2 | 7/2005 | Kurosawa | |
| 6,919,982 B2 | 7/2005 | Nimura | |
| 6,934,072 B1 | 8/2005 | Kim | |
| 6,934,073 B1 | 8/2005 | Kim | |
| 6,943,950 B2 | 9/2005 | Lee | |
| 6,958,777 B1 | 10/2005 | Pine | |
| 6,970,284 B1 | 11/2005 | Kim | |
| 6,995,909 B1 | 2/2006 | Hayashi | |
| 6,999,226 B2 | 2/2006 | Kim | |
| 7,023,466 B2 | 4/2006 | Favalora | |
| 7,031,046 B2 | 4/2006 | Kim | |
| 7,046,447 B2 | 5/2006 | Raber | |
| 7,068,416 B2 | 6/2006 | Gim | |
| 7,077,523 B2 * | 7/2006 | Seo et al. | 353/10 |
| 7,161,729 B2 | 1/2007 | Kim | |
| 2002/0018407 A1 | 2/2002 | Komoto | |
| 2002/0102102 A1 | 8/2002 | Watanabe | |
| 2002/0135673 A1 | 9/2002 | Favalora | |
| 2003/0058520 A1 | 3/2003 | Yu | |
| 2003/0071125 A1 | 4/2003 | Yoo | |
| 2003/0174234 A1 | 9/2003 | Kondo | |
| 2003/0184843 A1 | 10/2003 | Moon | |
| 2004/0009683 A1 | 1/2004 | Hiraoka | |
| 2004/0012460 A1 | 1/2004 | Cho | |
| 2004/0021802 A1 | 2/2004 | Yoshino | |
| 2004/0052180 A1 | 3/2004 | Hong | |
| 2004/0246362 A1 | 12/2004 | Konno | |
| 2004/0252958 A1 | 12/2004 | Abu-Ageel | |
| 2005/0024736 A1 | 2/2005 | Bakin | |
| 2005/0057812 A1 | 3/2005 | Raber | |
| 2005/0136663 A1 | 6/2005 | Terence Gan | |
| 2005/0174625 A1 | 8/2005 | Huiber | |
| 2005/0180019 A1 | 8/2005 | Cho | |
| 2005/0212856 A1 | 9/2005 | Temple | |
| 2005/0224695 A1 | 10/2005 | Mushika | |
| 2005/0225884 A1 | 10/2005 | Gim | |
| 2005/0231792 A1 | 10/2005 | Alain | |
| 2005/0264226 A1 | 12/2005 | Cho | |
| 2005/0264867 A1 | 12/2005 | Cho | |
| 2005/0264870 A1 | 12/2005 | Kim | |
| 2006/0012766 A1 | 1/2006 | Klosner | |
| 2006/0012852 A1 | 1/2006 | Cho | |
| 2006/0028709 A1 | 2/2006 | Cho | |
| 2006/0187524 A1 | 8/2006 | Sandstrom | |
| 2006/0232498 A1 * | 10/2006 | Seo et al. | 345/6 |

FOREIGN PATENT DOCUMENTS

| | | |
|---|---|---|
| JP | 11-069209 | 3/1999 |
| JP | 2002-288873 | 10/2002 |

\* cited by examiner

ND IMAGING SYSTEM

REFERENCE TO RELATED APPLICATIONS

This application is a continuation-in-part of, and claims priority to U.S. patent application Ser. No. 10/822,414 filed Apr. 12, 2004, U.S. patent application Ser. No. 10/855,715 filed May 27, 2004, U.S. patent application Ser. No. 10/872,241 filed Jun. 18, 2004, U.S. patent application Ser. No. 10/893,039 filed Jul. 16, 2004, U.S. patent application Ser. No. 10/896,146 filed Jul. 21, 2004, U.S. patent application Ser. No. 10/979,612 filed Nov. 2, 2004, U.S. patent application Ser. No. 10/983,353 filed Nov. 8, 2004, U.S. patent application Ser. No. 11/072,597 filed Mar. 4, 2005, U.S. patent application Ser. No. 11/076,616 filed Mar. 10, 2005, U.S. patent application Ser. No. 11/191,886 filed Jul. 28, 2005, U.S. patent application Ser. No. 11/208,115 filed Aug. 19, 2005, U.S. patent application Ser. No. 11/218,814 filed Sep. 2, 2005, U.S. patent application Ser. No. 11/286,971 filed Nov. 23, 2005, U.S. patent application Ser. No. 11/294,944 filed Dec. 6, 2005, U.S. patent application Ser. No. 11/300,205 filed Dec. 13, 2005, U.S. patent application Ser. No. 11/314,408 filed Dec. 20, 2005, U.S. patent application Ser. No. 11/319,987 filed Dec. 28, 2005, U.S. patent application Ser. No. 11/341,214 filed Jan. 28, 2006, and U.S. patent application Ser. No. 11/369,797 filed Mar. 6, 2006, all of which are hereby incorporated by reference.

FIELD OF INVENTION

The present invention relates to a three-dimensional imaging system using a micromirror array lens.

BACKGROUND OF THE INVENTION

There are so many different three-dimensional imaging systems as well as so many different ways to represent an object in three-dimensional space. The most popular three-dimensional imaging system is stereoscopic imaging systems, which acquire depth information from a scene in the form that the parallax phenomenon of human eyes is simulated. When human eyes see a scene, right and left side eyes have two different perspectives due to their separation. The brain fuses these two perspectives and assesses the visual depth. Similarly to human eyes, stereoscopic three-dimensional imaging systems take two perspective images by two parallel cameras that are disposed to view the scene from different angles at the same time as disclosed in U.S. Pat. No. 5,432,712 to Chan. These devices, however, tend to be large and heavy, and come at high cost due to multiple camera systems and their optical axis separation requirement. Also, when stereoscopic images are displayed for three-dimensional viewing, many technical problems can be arisen involved with arbitrary distribution of the viewer's position, watching by multiple viewers, binocular disparity due to deviations in the distance between the two eyes, vergence, fatigue accumulation in the eye, accommodation, the relative position change of the three-dimensional image due to viewer's movement, etc.

U.S. Pat. No. 6,503,195 to Keller discloses a structured light depth extraction system in which a projector projects a structured light pattern such as grids in the visible or invisible form onto an object, and then an image processor calculates depth information based on the reflected light pattern. In case of using visible light, image quality can be degraded while using invisible light requires an additional sensor system. Also, performance of the structured light depth extraction system depends on the reflectivity of the object.

U.S. Pat. No. 3,506,327 to Leith discloses a holographic imaging system, which uses coherent radiation to produce an object-bearing beam and reference beam. These two beams produce a pattern of interference fringe on the detector, wherein the intensity and phase information of light are recorded. Three-dimensional image can be reconstructed by illuminating the pattern of interference fringe with the reference beam. The maximum image depth is limited by mainly the coherence length of the beam. The holographic imaging system requires expensive and high power consuming coherent light source such as laser and the near darkroom conditions for imaging. Therefore, the holographic imaging system is not applicable to portable imaging devices as well as may cause some safety concerns using in the public area.

U.S. Pat. No. 5,032,720 to White and U.S. Pat. No. 6,949,069 to Farkas disclose a three-dimensional confocal system in which a point of interest is illuminated by a light source using a pinhole aperture. The confocal system can provide a high resolution three-dimensional image with a single camera system, but most of illuminating light is wasted and causes noise problem. To overcome this, U.S. Pat. No. 6,749,346 to Dickensheets and U.S. Pat. No. 6,563,105 to Seibel use a single optical fiber to scan and collect reflected light, but point by point scanning can lead to a slow image refresh rate.

The depth from focus criteria is well known for three-dimensional imaging, wherein a sequence of images is taken by changing the camera focus and in-focus regions are extracted from the images. Camera focus can be changed in many different ways. U.S. Pat. No. 5,986,811 to Wohlstadter discloses a three-dimensional imaging method and system using conventional motorized optics having an input lens and an output lens to change the focal length of the imaging system. Conventional motorized optics has a slow response time and complex driving mechanisms to control the relative position of the lenses. Therefore, it is difficult to use in the real-time imaging system and miniaturize the imaging system.

U.S. Pat. No. 6,344,930 to Kaneko discloses a total-focus imaging system using a sealed liquid lens actuated by a piezo-electric actuator to change the focal length of the imaging system. The proposed liquid lens has a slow focal length change speed of several hundreds of Hz. The system can have only a half dozen of focal length changes for each three-dimensional image when considering the standard video or movie rate. Besides, the lens has a small focal length variation range. These problems limit the possible range of depth and the depth resolution of the three-dimensional image.

A most advanced variable focal length lens is a liquid crystal variable focal length lens, wherein its focal length is changed by modulating the refractive index. However, it has a complex mechanism to control it and a slow response time typically on the order of hundreds of milliseconds, while the fastest response liquid crystal lens has a response time of tens of milliseconds, which still provides a low depth resolution three-dimensional image. Also, it has a small focal length variation and a low focusing efficiency.

A high speed, large variation of numerical aperture, and large diameter of variable focal length lens is necessary to get a real-time, large range of depth, and high depth resolution three-dimensional image.

SUMMARY OF THE INVENTION

An objective of the invention is to provide a real-time three-dimensional imaging system that can provide an all-in-focus image and depth information for each pixel of the all-in-focus image.

Another objective of the invention is to provide a real-time three-dimensional imaging system that can provide depth-wise images and depth information for each depthwise image.

Another objective of the invention is to provide a three-dimensional imaging system that can compensate for various optical distortions or aberrations.

In the present invention, three-dimensional imaging is achieved based on the depth from focus criteria, aforementioned. The three-dimensional imaging system of the present invention comprises at least one variable focal length Micro-Mirror Array Lens (MMAL), an imaging unit, and an image processing unit.

The variable focal length MMAL comprises a plurality of micromirrors. Each micromirror has the same function as a mirror. Micromirrors in the MMAL are arranged in a shape depending on the geometry of the imaging system on a substantially flat plane. The MMAL works as a reflective focusing lens by making all light scattered from one point of an object have the same periodical phase and converge at one point on the image plane. Each micromirror in the MMAL is controlled to have desired translation and rotation to satisfy the convergence and phase matching conditions for forming an image of the object, wherein each micromirror of the MMAL is actuated by the electrostatic and/or the electromagnetic force.

The MMAL has many advantages over conventional variable focus lenses including a very fast response time because each micromirror has a tiny mass, a large focal length variation because large numerical aperture variations can be achieved by increasing the maximum rotational angle of the micromirrors, a high optical focusing efficiency, a large aperture without losing optical performance, low cost because of the advantage of mass productivity of microelectronics manufacturing technology, capability of compensating for phase errors introduced by the medium between the object and the image and/or correcting the defects of the lens system that cause its image to deviate from the rules of paraxial imagery, simpler focusing mechanism, and low power consumption when electrostatic actuation is used to control it.

The following U.S. patents and applications describe the MMAL: U.S. Pat. No. 6,934,072 to Kim, U.S. Pat. No. 6,934,073 to Kim, U.S. Pat. No. 6,970,284 to Kim, U.S. Pat. No. 6,999,226 to Kim, U.S. Pat. No. 7,031,046 to Kim, U.S. patent application Ser. No. 10/857,714 filed May 28, 2004, U.S. patent application Ser. No. 10/893,039 filed Jul. 16, 2004, and U.S. patent application Ser. No. 10/983,353 filed Nov. 8, 2004, all of which are hereby incorporated by reference.

The variable focal length MMAL changes its surface profile to change its focal length by controlling the rotation and translation of each micromirror in the MMAL. The focal length of the variable focal length MMAL is changed with a plurality of steps in order to scan the whole object.

The imaging unit comprising at least one two-dimensional image sensor captures images formed on the image plane by the variable focal length MMAL. As the focal length of the variable focal length MMAL is changed, the in-focus regions of the object are also changed accordingly.

The image processing unit extracts the substantially in-focus pixels of each captured image received from the imaging unit and generates a corresponding depthwise image using the extracted in-focus pixels of each captured image. Depth information, or distance between the imaging system and the in-focus region of the object is determined by known imaging system parameters including the focal length and distance between the MMAL and the image plane. The image processing unit can combine these depthwise images to make an all-in-focus image. There are several methods for the image processing unit to obtain depthwise images or an all-in-focus image (e.g. edge detection filter). Recent advances in both the image sensor and the image processing unit make them as fast as they are required to be. Depending on the display methods of three-dimensional display systems, the three-dimensional imaging system can provides depthwise images with depth information for each depthwise image or one all-in-focus image with depth information for each pixel of the all-in-focus image. All the processes are achieved within a unit time which is less than or equal to the persistent rate of the human eye.

The three-dimensional imaging system of the present invention compensates for aberrations using the MMAL. Since the MMAL is an adaptive optical component, the MMAL compensates for phase errors of light introduced by the medium between an object and its image and/or corrects the defects of the three-dimensional imaging system that may cause the image to deviate from the rules of paraxial imagery by controlling individual micromirrors in the MMAL.

Because conventional refractive lenses are positioned to be perpendicular about optical axis, surface profile of the lens is generally axis-symmetric. However, the variable focal length MMAL is reflective lens. The three-dimensional imaging system can further comprise a beam splitter positioned in the path of light between the imaging unit and the MMAL to have normal incident optical geometry onto the MMAL. Alternatively, in order to defect the light into a sensor, the MMAL can be positioned so that the path of the light reflected by the MMAL is not blocked without using a beam splitter. When the MMAL is tilted about an axis (tilting axis), which is perpendicular to the optical axis, the surface profile of the MMAL is symmetric about an axis which is perpendicular to the optical axis and tilting axis. The tilted MMAL can cause non axis-symmetric aberrations. To have the desired focal length and compensate for non axis-symmetric aberrations, motion of each micromirror is controlled independently and has two rotational degrees of freedom and one translational degree of freedom.

For an axis-symmetric MMAL, micromirrors at the same radius have same motion. Therefore, the mirrors at the same radius are controlled dependently and motion of each micromirror can have one rotational degree of freedom and one translational degree of freedom to make an axis-symmetric MMAL.

Also, an object which does not lie on the optical axis can be imaged by the MMAL without macroscopic mechanical movement of the three-dimensional imaging system.

In order to obtain a color image, the MMAL is controlled to compensate for chromatic aberration by satisfying the phase matching condition for each wavelength of Red, Green, and Blue (RGB), or Yellow, Cyan, and Magenta (YCM), respectively. The three-dimensional imaging system may further comprise a plurality of bandpass filters for color imaging. Also, the three-dimensional imaging system may further comprise a photoelectric sensor. The photoelectric sensor comprises Red, Green, and Blue sensors or Yellow, Cyan, and Magenta sensors, wherein color images are obtained by the treatments of the electrical signals from each sensor. The treatment of electrical signal from sensor is synchronized and/or matched with the control of the MMAL to satisfy the phase matching condition for each wavelength of Red, Green, and Blue or Yellow, Cyan, and Magenta, respectively.

Furthermore, the MMAL can be controlled to satisfy phase matching condition at an optimal wavelength to minimize chromatic aberration, wherein optimal wavelength phase matching is used for getting a color image. The MMAL is controlled to satisfy phase matching condition for the least common multiple wavelength of Red, Green, and Blue or Yellow, Cyan, and Magenta lights to get a color image.

The three-dimensional imaging system can further comprise an optical filter or filters for image quality enhancement.

The three-dimensional imaging system can further comprise an auxiliary lens or group of lenses for image quality enhancement.

The three-dimensional imaging system can further comprise additional MMAL or MMALs for imaging with magnification.

The three-dimensional imaging system can further comprises extra MMAL or MMALs to compensate for aberrations of the imaging system including chromatic aberration.

In summary, the three-dimensional imaging system of the present invention has the following advantages: (1) the system can make a real-time three-dimensional image because the MMAL has a fast focusing time; (2) the system has a large range of depth because the MMAL has a large focal length variation; (3) the system has a high optical efficiency; (4) the system can have high depth resolution by controlling the focal length of the MMAL in the small scale; (5) the cost is inexpensive because the MMAL is inexpensive; (6) the system can compensate for aberrations of the imaging system; (7) the system is very simple because there is no macroscopic mechanical displacement or deformation of the lens system; (8) the system is compact; and (9) the system requires small power consumption when the MMAL is actuated by electrostatic force.

Although the present invention is briefly summarized herein, the full understanding of the invention can be obtained by the following drawings, detailed description, and appended claims.

DESCRIPTION OF THE FIGURES

These and other features, aspects and advantages of the present invention will become better understood with reference to the accompanying drawings, wherein.

DETAILED DESCRIPTION OF THE INVENTION

Figure 1:
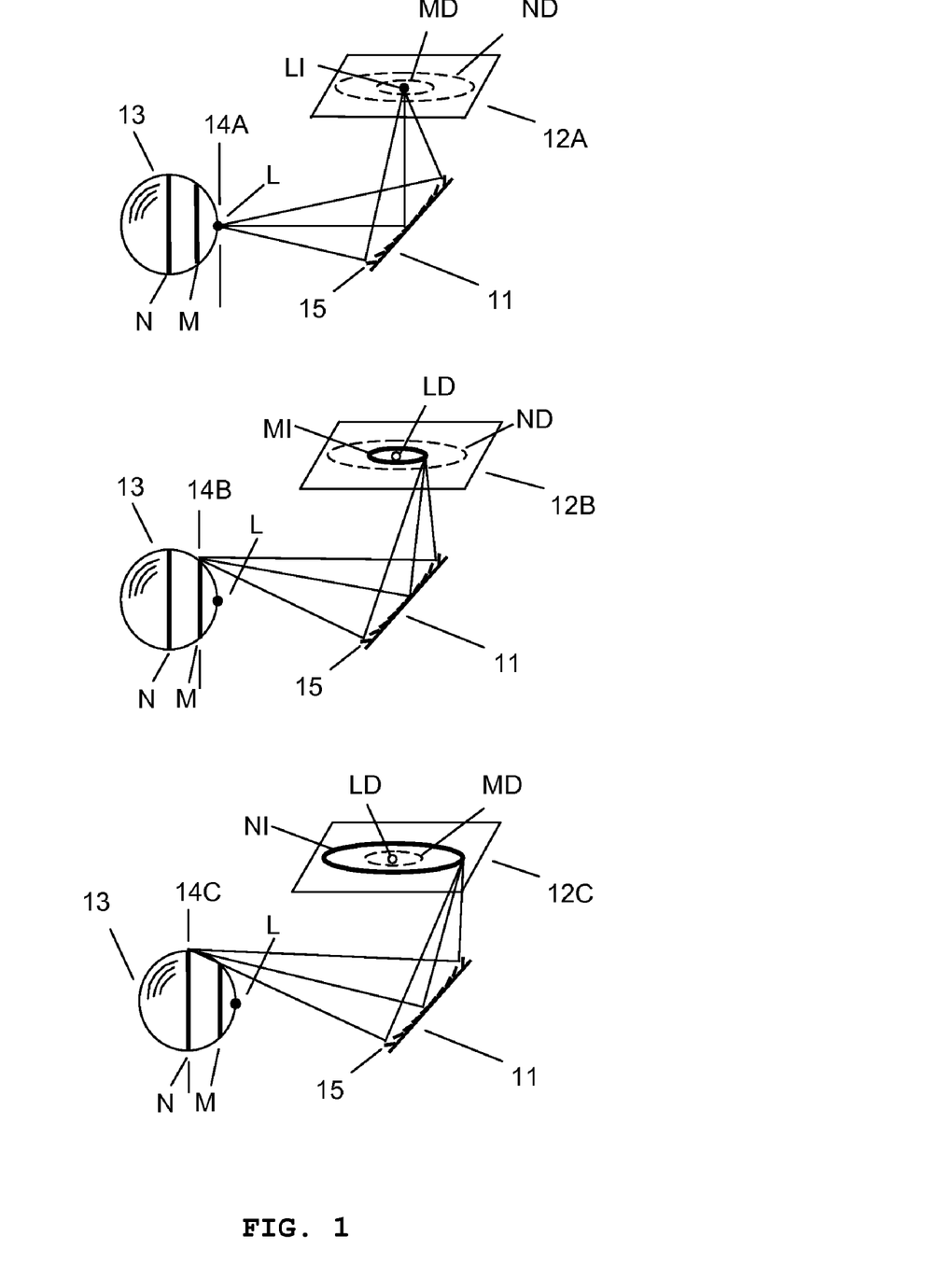
FIG. 1 is a schematic diagram showing how a three-dimensional image is obtained from two-dimensional images captured by a variable focal length MicroMirror Array Lens (MMAL)

FIG. 1 shows how a three-dimensional image is obtained from two-dimensional images captured by a variable focal length MMAL 11. Two-dimensional images 12A, 12B, and 12C are captured by changing the focal length of the MMAL 11. Captured two-dimensional images 12A, 12B, and 12C have different in-focus pixels because the in-focus plane in an object 13 is varied as the focal length of the MMAL 11 is varied. The captured two-dimensional image 12A with the first focal length has an in-focus image LI which is the image of the portion L of the object 13. The portion L of the object 13 lies on the in-focus plane 14A while images MD, ND of portion M, N of the object 13 are defocused. Therefore, the image processing unit can extract the in-focus pixels LI from the captured two-dimensional images 12A and generate a depthwise image, which contains only in-focus pixels. The distance between the in-focus plane 14A in the object and the imaging system can be estimated by using known imaging system parameters including the focal length and distance between the MMAL 11 and the image plane. The captured two-dimensional images 12B and 12C with the second and the third focal lengths are processed in the same manner as the first captured two-dimensional image 12A to provide depthwise images and depth information for each depthwise image. The focal length of the MMAL 11 is changed by controlling the rotation and/or translation of each the micromirror 15 using electrostatic and/or electromagnetic force. For any given focal length, the imaging system can have only one in-focus plane in the object, which may lead to infinitesimal focal length changes with infinite number of steps to provide an all-in-focus image. In practice, the imaging system has a depth of field, which is the distance from near to far that the object appears to be in-focus. In this invention, the imaging processing unit extracts substantially in-focus pixels from the captured two-dimensional image that appears to be in-focus.

Figure 2:
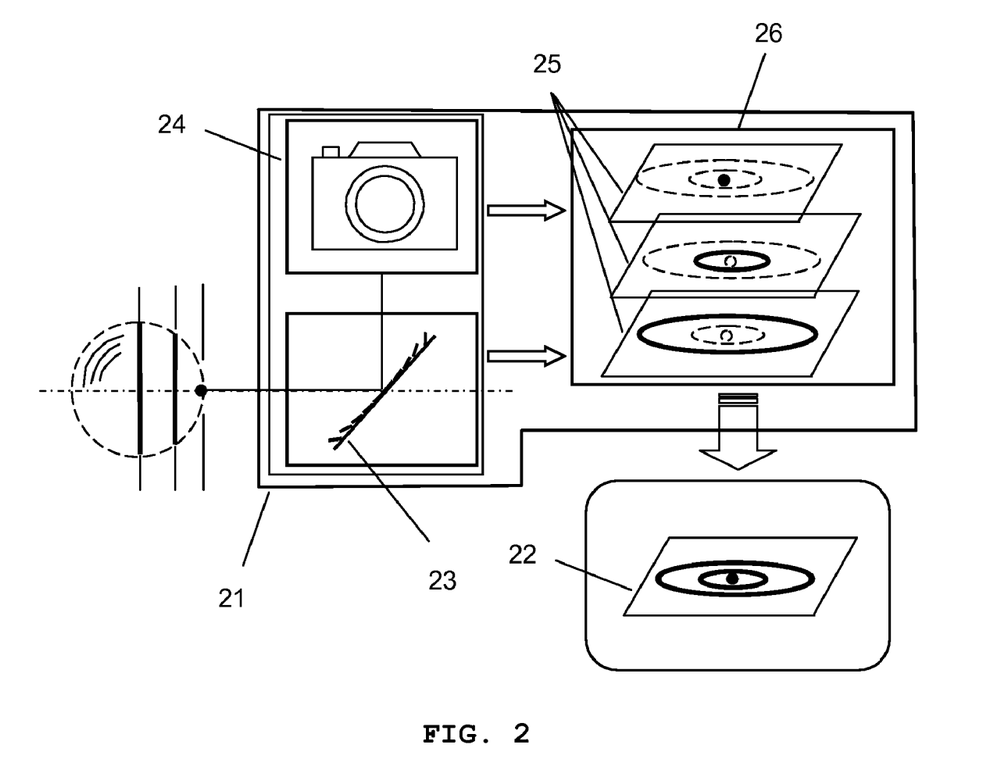
FIG. 2 is a schematic diagram showing a three-dimensional imaging system using a variable focal length MMAL.

FIG. 2 shows a three-dimensional imaging system 21 according to one embodiment of the present invention, which provides depthwise images and depth information for each depthwise image or an all-in-focus image 22 and depth information for each pixel of the all-in-focus image using a variable focal length MMAL. The system comprises at least one variable focal length MMAL 23, an imaging unit 24 capturing images 25 with different focal lengths which are changed by the variable focal length MMAL 23, and an image processing unit 26.

As the MMAL 23 changes its focal length according to selected steps, the imaging unit 24 comprising at least one two-dimensional image sensor captures two-dimensional images 25 at an image plane. The image processing unit 26 extracts the substantially in-focus pixels of each captured image and generates a corresponding depthwise image using the extracted in-focus pixels of each captured image. Also, depending on the display methods of three-dimensional display systems, the image processing unit 26 can generate an all-in-focus image and depth information for each pixel of the all-in-focus image. All the processes are achieved within a unit time which is less than or equal to the persistent rate of the human eye.

The number of focal length change steps is determined by the required depth resolution and the range of depth of the object to be imaged. To provide real-time three-dimensional video images, the whole object is scanned within the unit time, which is less than or equal to the persistent rate of the human eye. The necessary focal length changing rate of the MMAL is the number of required focal length changes times the persistent rate of the human eye. The image sensing and processing speed needs to be equal to or faster than the focal length change speed of the MMAL to provide real-time three-dimensional imaging. Recent advances in both the image sensor and the image processing unit make them as fast as they are required to be.

Figure 3:
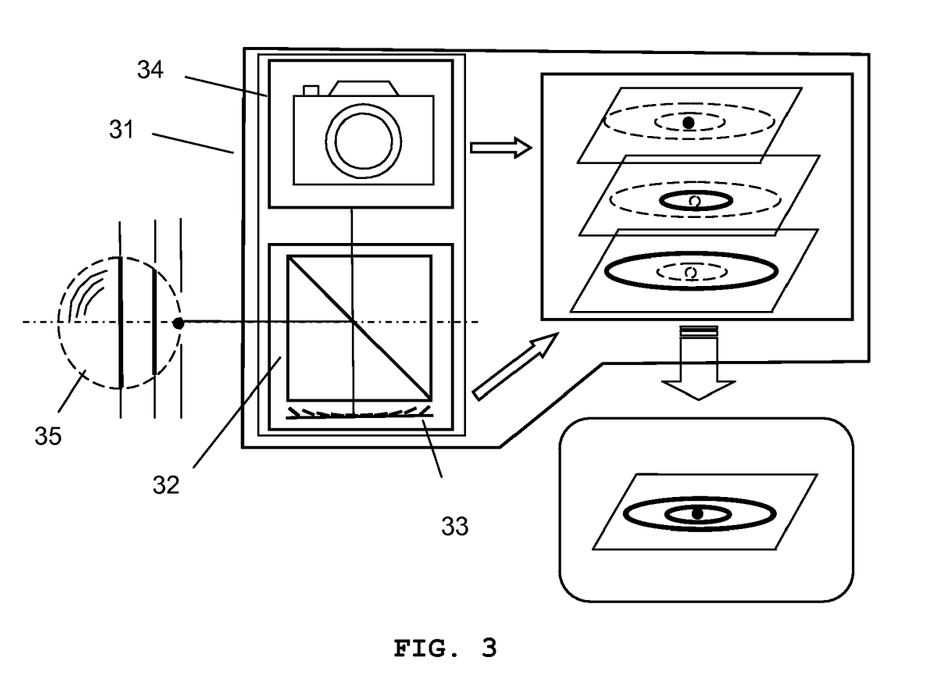
FIG. 3 is a schematic diagram showing the three-dimensional imaging system using a beam splitter and a variable focal length MMAL.

FIG. 3 shows an alternative arrangement in which the three-dimensional imaging system 31 further comprises a beam splitter 32 positioned in the path of light between the MMAL 33 and the image sensor 34. Since the MMAL 33 is a reflective type, the system 31 cannot be aligned in a line. An optical arrangement in which the reflected light is not blocked by the object 35 is required. The beam splitter 32 changes the direction of the light by 90°, and thus the MMAL is positioned orthogonal to the light path.

Figure 8:
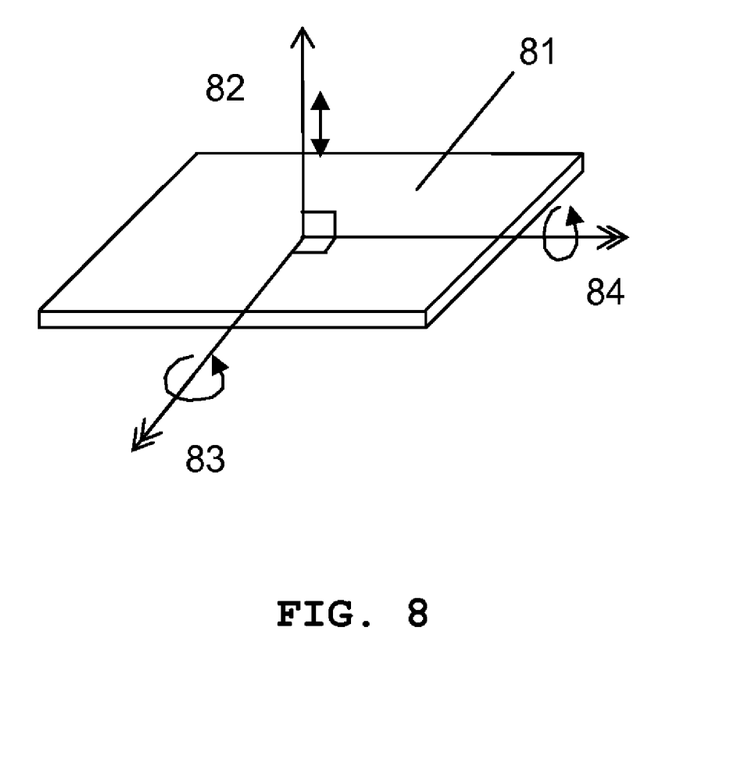
FIG. 8 is a schematic diagram showing two rotational axes and one translational axis of the micromirror.

Alternatively, as shown in FIG. 2, the MMAL 23 is positioned so that the path of the light reflected by the MMAL 23 is not blocked without using a beam splitter. MMAL can be tilted in the imaging system so that the normal direction of the MMAL is different from the optical axis of the imaging system. When the MMAL is tilted about an axis, which is perpendicular to the optical axis, the surface profile of the MMAL is symmetric about an axis which is perpendicular to the axis of normal direction of the MMAL and tilting axis. The tilted MMAL 23 can induce non axis-symmetric aberrations. To have the desired focal length and compensate for non axis-symmetric aberrations, each micromirror is provided with two rotational degrees of freedom and one translational degree of freedom motions, as shown in FIG. 8.

Figure 4:
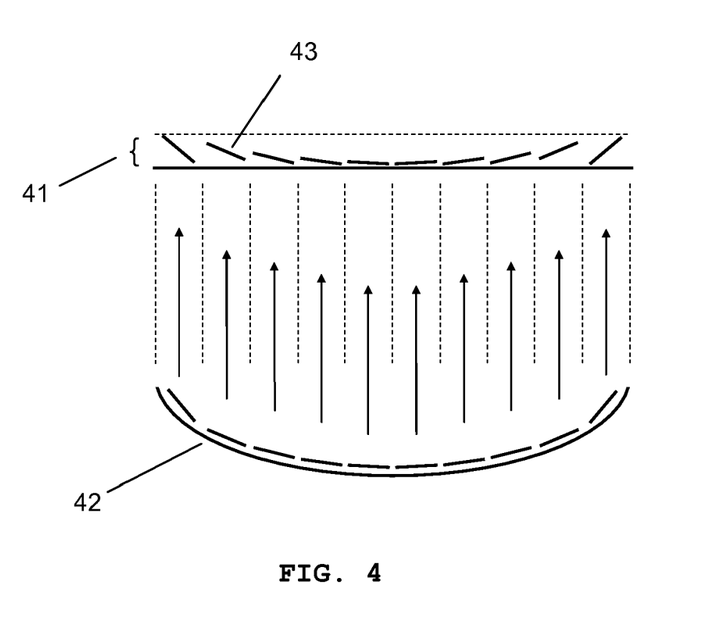
FIG. 4 shows the principle of a variable focal length MMAL.

FIG. 4 shows the principle of a MMAL 41. There are two conditions for a perfect lens. The first is a converging condition that all light scattered by one point of an object should converge into one point of the image plane. The second is the same phase condition that all the converging light should have same phase at the image plane. To satisfy the perfect lens conditions, the surface shape of conventional reflective lens 42 is generated to have all light scattered from one point of an object to be converged into one point on the image plane and have the optical path length of all the converging light to be same. Even though the optical path length of the converging light is different, the same phase condition can be satisfied because a phase of light is periodic. The surface shape of the conventional reflective lens 42 satisfying perfect lens conditions can be replaced by rotation and translation of micromirrors 43. Each micromirror 43 rotates to converge the scattered light and translates to adjust the phase.

Figure 5:
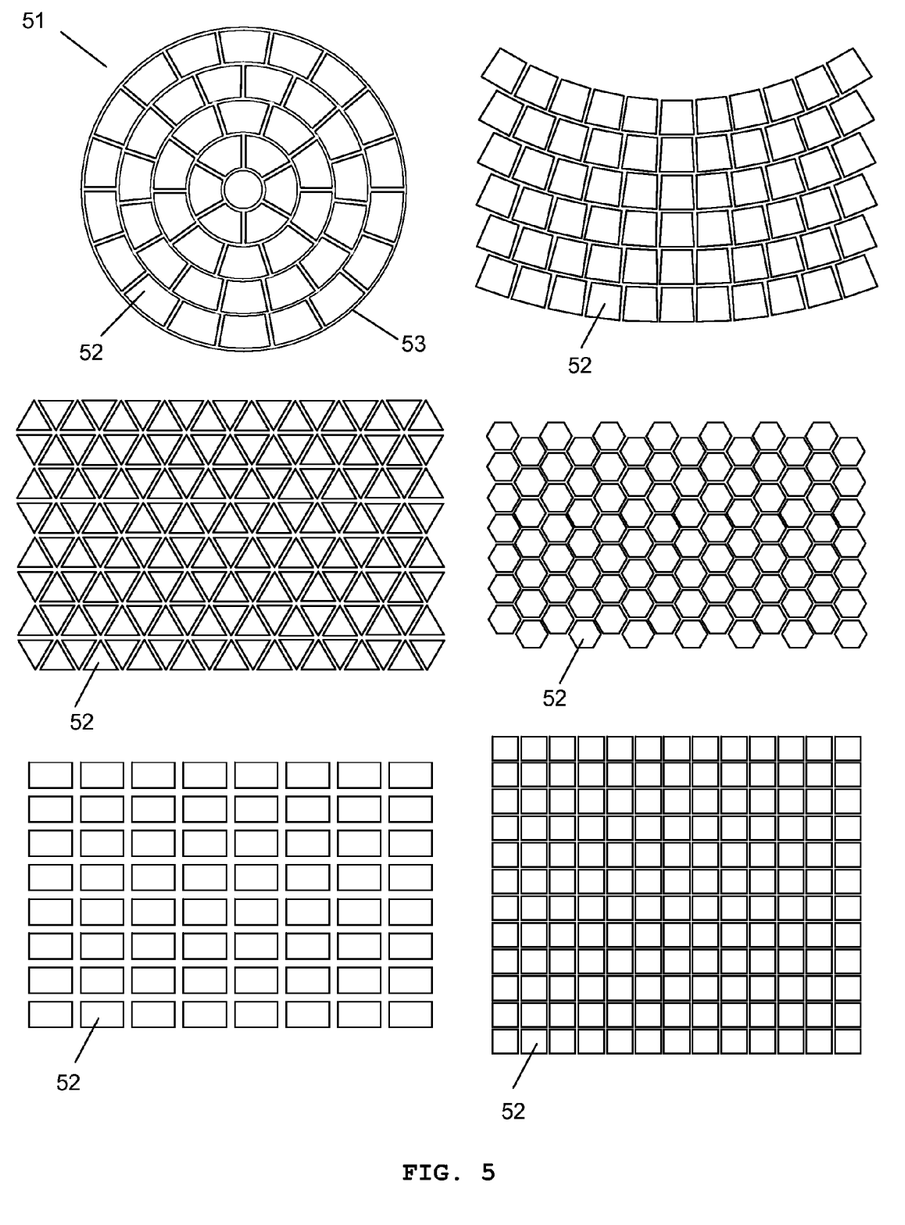
FIG. 5 shows exemplary arrangements of micromirrors for various MMALs.

FIG. 5 shows exemplary arrangements of micromirrors in various MMALs 51. Micromirrors can have various shapes such as a fan shape, a hexagonal shape, a rectangular shape, a square shape, a triangular shape, mixed shapes, etc. Preferably, micromirrors are arranged depending on the geometry of the imaging system although it is not necessary. Each micromirror 52 of the MMAL 51 is electrostatically and/or electromagnetically controlled by actuating components 53. The mechanical structures holding each micromirror and the actuating components to rotate and translate the micromirrors 52 are located on the opposite side of the reflective surface of micromirrors 52 so that the micromirrors 52 are to be closer to one another thereby increasing the effective reflective area or optical efficiency.

Figure 6:
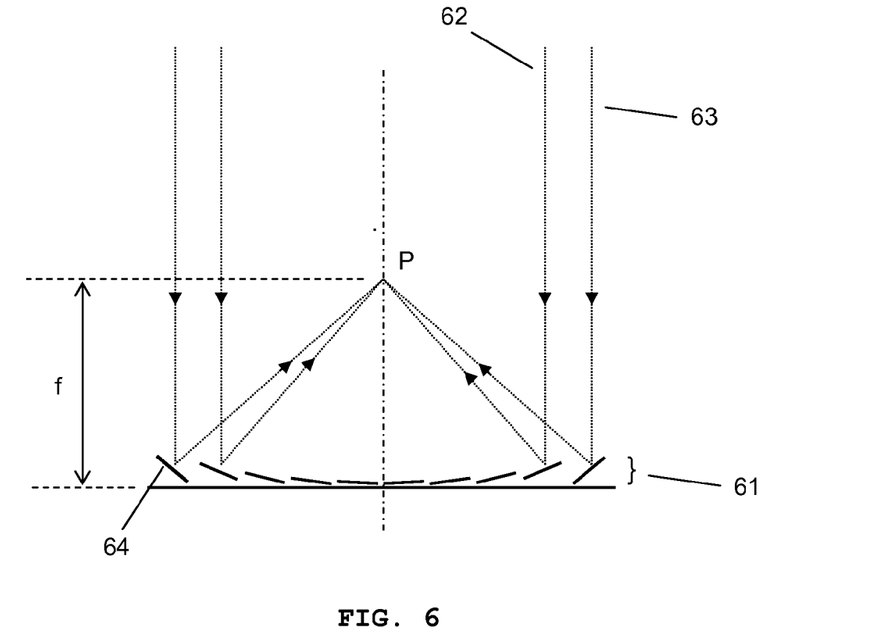
FIG. 6 is a schematic diagram showing how a variable focal length MMAL works as a lens.

FIG. 6 illustrates how a variable focal length MMAL 61 works as a lens. Arbitrary scattered lights 62 and 63 are converged into one point P on the image plane by controlling the position of each of the micromirrors 64 independently. Phases of arbitrary lights 62 and 63 can be adjusted to be the same by rotating and translating each of the micromirrors 64. The required translational displacement is at least half of the wavelength of light.

The focal length f of the MMAL 61 is changed by controlling the rotation and/or translation of the micromirror 64. The operation of the MMAL 61 is possible by controlling only rotation without controlling translation even though it can not satisfy the phase condition. In this case, the imaging quality of the lens 61 generated by controlling only rotation is degraded by the aberration. Pure translation without rotation can satisfy the two imaging conditions by Fresnel diffraction theory. The lens generated by the control of only translation has the aberration too. The smaller the size of the micromirrors 64, the less the aberration. Even though the quality of the lens with one motion is lower than the lens with rotation and translation, the lens with one motion has the advantage that its control and fabrication is easier than the lens with both rotation and translation.

It is desired that each of the micromirrors 64 has a curvature because the ideal shape of a conventional reflective lens has a curvature. However, the aberration of the lens with flat micromirrors 64 is not much different from the lens with curvature if the size of each micromirror is small enough. For most applications, flat micromirrors can be used.

Figure 7:
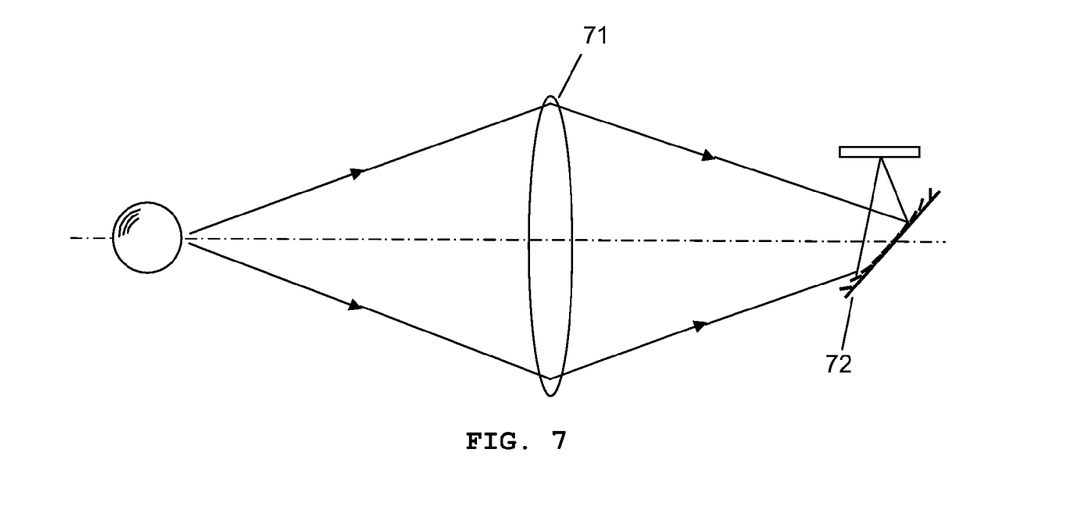
FIG. 7 is a schematic diagram showing a three-dimensional imaging system using an auxiliary lens.

FIG. 7 shows that an effective focal length and numerical aperture of the three-dimensional imaging system can be extended or changed by an auxiliary lens 71 having a predetermined focal length. An auxiliary lens 71 with large numerical aperture can increase numerical aperture of the three-dimensional imaging system. Also, the effective focal length of the three-dimensional imaging system can be changed to desired range by the auxiliary lens 71 and a MMAL 72.

As shown in FIG. 8, the present invention provides each micromirror 81 with three degrees-of-freedom motion, one translational motion 82 along the normal axis to the plane of each MMAL, and two rotational motions 83 and 84 about two axes in the plane of each MMAL. The translational and rotational motions of each micromirror in the MMAL are required to deflect light to arbitrary direction and to compensate for non axis-symmetric aberrations of the imaging system.

Figure 9A:
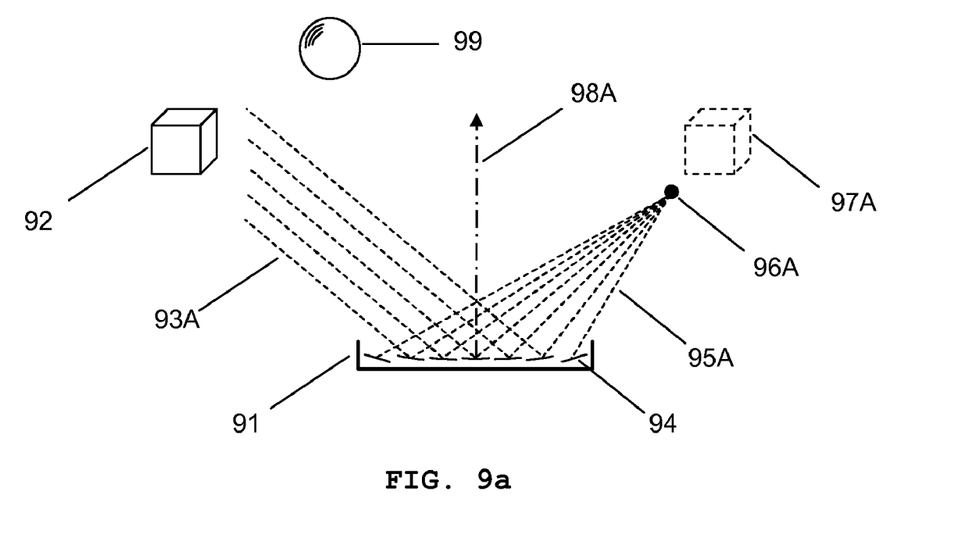
FIG. 9 is a schematic representation for optical axis changes in the MMAL.

The FIG. 9 shows how the optical axis of the MMAL changes. A bunch of light is focused by the MMAL 91. In FIG. 9a, a cube object 92 is imaged onto the image plane. The light 93A from the object 92 is reflected by each of the micromirror 94. The reflected light 95A is focused onto the focal point 96A of the image and finally makes an image of a cube 97A in the image sensor. During the focusing process the optical axis is defined as a surface normal direction 98A of a micromirror 94.

Figure 9B:
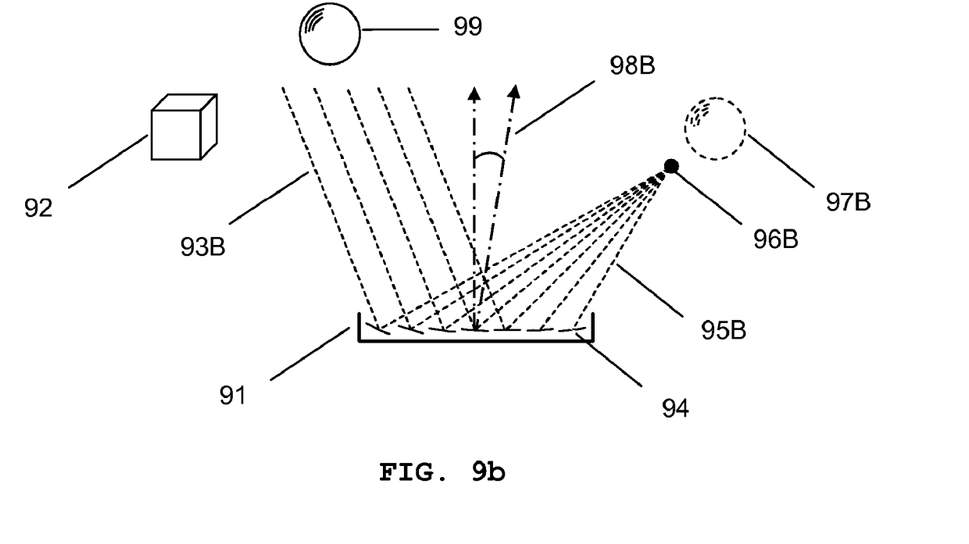

As shown in FIG. 9b, the MMAL can make a different image 97B from a different object 99 without macroscopic movements. By changing the respective angles of the micromirrors 94, this time the MMAL accepts the light 93B from the sphere 99. The reflected light 95B is focused onto a focal point 96B and makes the image of the sphere 97B. This time the optical axis is changed by an angle and becomes the surface normal direction 98B of a micromirror.

The MMAL is an adaptive optical component because the phase of light can be changed by the translations and/or rotations of micromirrors. The MMAL can correct the phase errors as an adaptive optical component can correct the phase errors of light introduced by the medium between the object and its image and/or corrects the defects of a lens system that cause its image to deviate from the rules of paraxial imagery. For an example, the MMAL can correct the phase error caused by optical tilt by adjusting the translations and/or rotations of micromirrors.

The same phase condition satisfied by the MMAL uses an assumption of monochromatic light. Therefore, to get a color image, the MMAL of the three-dimensional imaging system is controlled to satisfy the same phase condition for each wavelength of Red, Green, and Blue (RGB), or Yellow, Cyan, and Magenta (YCM), respectively, and the three-dimensional imaging system can use bandpass filters to make monochromatic lights with wavelengths of Red, Green, and Blue or Yellow, Cyan, and Magenta.

If a color photoelectric sensor is used as an image sensor in the three-dimensional imaging system using a variable focal length MMAL, a color image can be obtained by processing electrical signals from Red, Green, and Blue sensors with or without bandpass filters, which should be synchronized with the control of the MMAL.

To image the Red light scattered from an object, the MMAL is controlled to satisfy the phase condition for the Red light and Red, Green, and Blue image sensors measure the intensity of each Red, Green, and Blue light scattered from an object. Among them, only the intensity of Red light is stored as image data because only Red light is imaged properly. To image each Green and Blue light, the MMAL and each imaging sensor works in the same manner with the process of the Red light. Therefore, the MMAL is synchronized with Red, Green, and Blue imaging sensors.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A three-dimensional imaging system comprising: a) a variable focal length MicroMirror Array Lens (MMAL), wherein the MMAL comprises a plurality of micromirrors, wherein motion of each micromirror has two rotational degrees of freedom and one translational degree of freedom, wherein each of the micromirrors in the MMAL is controlled to change the focal length of the MMAL; b) an imaging unit which captures images formed on the image plane by the MMAL; and c) an image processing unit which produces three-dimensional image data using the images captured by the imaging unit and the focal length information of the MMAL.

2. The three-dimensional imaging system of claim 1, wherein the micromirrors are controlled to correct aberrations of the system.

3. The three-dimensional imaging system of claim 1, wherein motion of each micromirror is controlled independently.

4. The three-dimensional imaging system of claim 1, wherein the image processing unit generates the depth information of the object using the focal length of the MMAL while imaging three-dimensional objects.

5. The three-dimensional imaging system of claim 1, wherein each micromirror in the MMAL is controlled to have desired translation and rotation to satisfy the convergence and phase matching conditions for forming an image of the object.

6. The three-dimensional imaging system of claim 1, wherein each micromirror in the MMAL is actuated by the electrostatic force to have desired translation and rotation.

7. The three-dimensional imaging system of claim 1, wherein each micromirror in the MMAL is arranged in a substantially flat plane.

8. The three-dimensional imaging system of claim 1, wherein the imaging unit comprises at least one image sensor to capture images at the image plane.

9. The three-dimensional imaging system of claim 1, wherein the image processing unit produces three-dimensional image data from the images captured by the imaging unit.

10. The three-dimensional imaging system of claim 1, wherein the image processing unit generates depthwise images and depth information for each depthwise image using the images captured by the imaging system.

11. The three-dimensional imaging system of claim 1, wherein the image processing unit generates an all-in-focus image and depth information for each pixel of the all-in-focus image using the images captured by the imaging unit.

12. The three-dimensional imaging system of claim 1, wherein image sensing and image processing time is faster than the persistent rate of human eyes to have real-time three-dimensional images.

13. The three-dimensional imaging system of claim 1, further comprising additional MMAL or MMALs for imaging with magnification.

14. The three-dimensional imaging system of claim 1, further comprising extra MMAL or MMALs to compensate for aberrations of the system including chromatic aberration.

15. The three-dimensional imaging system of claim 1, wherein the MMAL is further controlled to compensate for chromatic aberration by satisfying the phase matching condition for each wavelength of Red, Green, and Blue (RGB) or Yellow, Cyan, and Magenta (YCM), respectively, to get a color images.

16. The three-dimensional imaging system of claim 15, further comprising a plurality of bandpass filters.

17. The three-dimensional imaging system of claim 15, further comprising photoelectric sensors, wherein the photoelectric sensors comprises Red, Green, and Blue (RGB) sensors or Yellow, Cyan, and Magenta (YCM) sensors, wherein color images are obtained by treatments of the electrical signals from each sensor.

18. The three-dimensional imaging system of claim 15, wherein the treatment of electrical signal from each sensor is synchronized and/or matched with the control of the MMAL to satisfy the phase matching condition for each wavelength of Red, Green, and Blue (ROB) or Yellow, Cyan, and Magenta (YCM), respectively.

19. The three-dimensional imaging system of claim 1, wherein the MMAL is controlled to satisfy phase matching condition at an optimal wavelength to minimize chromatic aberration, wherein the optimal wavelength phase matching is used for getting a color image.

20. The three-dimensional imaging system of claim 1, wherein the MMAL is controlled to satisfy phase matching condition for the least common multiple wavelength of Red, Green, and Blue lights or Yellow, Cyan, and Magenta to get a color image.

21. The three-dimensional imaging system of claim 1, further comprising an optical filter or filters for image quality enhancement.

22. The three-dimensional imaging system of claim 1, further comprising an auxiliary lens or group of lenses for image quality enhancement.

23. The three-dimensional imaging system of claim 1, further comprising a beam splitter positioned in the path of light between the imaging unit and the MMAL to have normal incident optical geometry onto the MMAL.

24. The three-dimensional imaging system of claim 1, wherein the MMAL is tilted in the three-dimensional imaging system so that the normal direction of the MMAL is different from the optical axis of the three-dimensional imaging system.

25. The three-dimensional imaging system of claim 24, wherein the profile of MMAL is symmetric about an axis which is perpendicular to the optical axis and the tilting axis.

26. The three-dimensional imaging system of claim 24, wherein each micromirror has one translational motion along the normal axis to the plane of each MMAL and two rotational motions about two axes in the plane of each MMAL.

27. The three-dimensional imaging system of claim 1, wherein the optical axis of MMAL is changed by controlling micromirrors.

* * * * *